United States Patent
Meeuwssen et al.

(10) Patent No.: US 8,078,323 B2
(45) Date of Patent: Dec. 13, 2011

(54) METHOD FOR CONTROLLING THE PROCESS OF SEPARATING MIXTURES CONTAINING SEVERAL SUBSTANCES

(75) Inventors: Frank Meeuwssen, BD Willemstad (NL); Franz Ferdinand Rhiel, Dormagen (DE); Torsten Hauschild, Gladbach (DE); Martin Gerlach, Dormagen (DE)

(73) Assignee: Bayer AG, Leverkusen (DE)

( * ) Notice: Subject to any disclaimer, the term of this patent is extended or adjusted under 35 U.S.C. 154(b) by 2398 days.

(21) Appl. No.: 10/490,006

(22) PCT Filed: Sep. 6, 2002

(86) PCT No.: PCT/EP02/09969
§ 371 (c)(1),
(2), (4) Date: Mar. 18, 2004

(87) PCT Pub. No.: WO03/024556
PCT Pub. Date: Mar. 27, 2003

(65) Prior Publication Data
US 2004/0249512 A1 Dec. 9, 2004

(30) Foreign Application Priority Data

Sep. 19, 2001 (DE) .................. 101 46 103
Nov. 19, 2001 (DE) .................. 101 56 720

(51) Int. Cl.
*G05B 21/00* (2006.01)
(52) U.S. Cl. .......... 700/270; 700/260; 700/90; 436/174; 73/23.35; 73/23.2; 73/19.01
(58) Field of Classification Search .................. 62/628, 62/646; 700/270, 266, 90; 203/DIG. 18; 73/23.35, 23.2, 19.01; 436/174
See application file for complete search history.

(56) References Cited

U.S. PATENT DOCUMENTS

| | | | | |
|---|---|---|---|---|
| 3,208,230 A | * | 9/1965 | Fourroux | 62/628 |
| 4,784,677 A | * | 11/1988 | Al-Chalabi | 62/656 |
| 5,260,865 A | | 11/1993 | Beauford et al. | 364/151 |
| 5,464,504 A | * | 11/1995 | Beauford | 203/3 |
| 5,589,630 A | * | 12/1996 | Wiegand et al. | 73/23.35 |
| 6,006,546 A | * | 12/1999 | Espie | 62/656 |

FOREIGN PATENT DOCUMENTS
DE 41 27 536 A1 2/1993
* cited by examiner

*Primary Examiner* — Christine T Mui
(74) *Attorney, Agent, or Firm* — Norris McLaughlin & Marcus PA

(57) ABSTRACT

Method for controlling the process of separating mixtures containing several substances having close boiling points and with a known concentration, in a distillation column, wherein the concentration of at least one component is measured at a midpoint of the column, and said measurement, together with other parameters, is used to control the process.

7 Claims, 2 Drawing Sheets

METHOD FOR CONTROLLING THE PROCESS OF SEPARATING MIXTURES CONTAINING SEVERAL SUBSTANCES

This is a 371 of PCT/EP02/09969 filed 6 Jul. 2002 (international filing date).

The invention relates to a method for process control of the separation of multisubstance mixtures of known composition in distillation columns. In particular, the invention relates to the separation of multisubstance mixtures having boiling points very close together, for example isomer mixtures, which are separated into their isomeric components with high product purity.

BACKGROUND OF THE INVENTION

The reaction stage in the nitration of toluene provides an isomer mixture comprising ortho-, meta- and para-nitrotoluene and also dinitrotoluene isomers and further components. The technical task is to remove the o-, m- and p-nitrotoluene isomers from this mixture and to obtain them in a high purity of at least 99.70%. This is done in a series of distillation columns connected in series, some of which are also connected together via circulation streams. As a consequence of the small boiling point differences of the nitrotoluene isomers to be obtained, distillation columns having a high number of plates and high reflux ratio are required for separation. In particular, the separation of m- and p-nitrotoluene whose boiling point difference is only about 3 K requires a high number of plates. For this reason, these isomers are separated in a column which, in terms of apparatus, is divided into two adjacent column sections having a total of one evaporator and one condenser. Owing to the low temperature sensitivity, it is impossible to use a column temperature as an auxiliary controlling parameter to control the concentration of p-nitrotoluene which is obtained at the bottom of the second column section.

Since column temperatures cannot be used as auxiliary control parameters to maintain the product specification of p-nitrotoluene, the process can be controlled by the use of online near infrared spectroscopy instruments. However, it is found that their use for analysis of the end product, i.e. at the liquid phase exit or column, has two distinct disadvantages. These are:

When the concentration of the end product (p-nitrotoluene) is measured, the NIR analysis provides measurements which, owing to the high concentration of p-nitro-toluene, do not have the required precision.

Even if it were possible to achieve the precision required for the process control with the analysis, the mounting of the measuring instrument in the end product stream is not viable, since concentration deviations are registered there too late and therefore counteracted too late.

Owing to the product properties, considerable contamination and discoloration in the end product stream is to be expected during the startup procedure of the process. This rules out the use of spectroscopy as an analytical method for the control of the process.

In-house investigations have shown that the highest sensitivity in the product stream in the event of concentration changes of the liquid phase product is between the two column sections. In the product stream mentioned, the concentration change is a factor of 10 higher than the resulting concentration change in the liquid phase product. Furthermore, a lower p-nitrotoluene concentration compared to the end product is present in the product stream between the columns. In this product stream, a higher precision is therefore achieved using the analytical instrument. The precision is approximately twice as high as in the case of a measurement in the end product.

The idea on which the invention is based is to accommodate the analytical instrument in the product stream between the two column sections. When the analytical instrument is then incorporated in a control circuit, this allows the concentration to be kept constant in the product stream between the two column sections. However, this does not ensure that the concentration of the end product removed at the bottom of the second column section also remains constant. The reason for this is that the separating performance of the second column section which is between the point at which the instrument is mounted and the column bottom is subject to constant changes as a consequence of control interventions and disruptive influences.

The object of the invention is achieved in accordance with the invention by coupling the online analytical instrument in the above-described arrangement with an online process model.

SUMMARY OF THE INVENTION

The present invention provides a method for process control of distillation columns having a lower column section and an upper column section with control of the liquid phase concentration to separate a plurality of components A, B preferably having boiling points very close together and to obtain the component obtained at the bottom of the lower column section in high purity, characterized in that a) the concentration of the components A, B is measured online at one point in the column outside the bottom or top region of the column, in particular at a point which is disposed in the middle region between the uppermost tenth and the lowermost tenth of the length of the overall column, using an analytical instrument, in particular a near infrared spectrometer, b) the concentration measured in a) of at least one of the components A or B is taken and used by an online process model in a computer unit of a process control system, and that the process model, within an interval time determined by the process control system and the control technique, calculates a liquid phase concentration $X_{ALP}$ using the measurement and further parameters measured directly in the column selected from temperature, pressure and mass flows, in particular of feed, heating medium feed, in particular vapor feed and reflux, c) the liquid phase concentration $X_{ALP}$ calculated using the process model is used for control, by treating the liquid phase concentration $X_{ALP}$ calculated by the model for control purposes as the actual value of the liquid phase concentration control parameter, d) certain parameters of the process model constitute physically interpretable parameters, in particular the number of theoretical plates of structured packings or random packings and/or the degree of tray efficacy, which are adapted within prolonged time intervals, in particular of several hours, in some cases even several days, to the particular column conditions, for example the degree of fouling, on the basis of analyses of the end product and introduction of the analytical data into the process model.

DETAILED DESCRIPTION

In a preferred variant, the method can also be carried out in a column divided into at least two subcolumns, and the concentration is measured a) in the region between the subcolumns.

Preference is given to a variant of the method using subcolumns, characterized in that, instead of the temperatures and mass flows of feed and reflux and also the heat energy, in particular the amount of vapor, the mass flows between the two sub columns and also their temperatures are also used in the process model.

Preference is given to disposing the analytical instrument in the method in the region between the uppermost fifth and the lowermost fifth of the length of the overall column.

Alternatively, the measurement of the liquid stream between the two subcolumns can be used together with the heat energy in the process model.

Instead of an NIR spectrometer, it is also possible to use other analytical instruments, for example gas chromatographs, UV-VIS spectrometers, liquid chromatographs.

The methods are preferably used to separate mixtures having boiling points separated by at most 20 K, in particular 10 K.

At a given temperature sensitivity, the concentration is preferably determined via a temperature and pressure measurement.

In an alternative variant of the method, the combination of online analysis and process model can also be used for concentration control of the top product.

The process is used in particular for the isomer separation of nitrotoluene and is preferably carried out as follows.

The analytical instrument measures the concentration of one component (for example p-nitrotoluene) in the product stream between the two column sections and passes it on to the process model. Building on this information, the model uses parameters measured directly at the column, for example mass flows, vapor feed and temperatures, to calculate the p-nitrotoluene concentration in the liquid phase product. The value determined by the model is treated as the actual value of the control parameter. The difference between the target and the actual value is an input parameter into the regulator, in particular into a PID controller component of the process control system. In the event of deviations between the target and the actual value, the regulator changes the control parameter, i.e. the vapor feed.

The value calculated by the online process model for the liquid phase concentration is of predictive character. Perturbations, caused, for example, by a change in mass flow or concentration in the feed, are registered at the point of connection of the instrument between the two columns before they reach the liquid phase. The model uses the currently measured concentration value and, with the aid of the present separating performance, calculates the resulting new concentration value for the liquid phase product. This value is the concentration which would be attained in the liquid phase product after approx. 20 to 30 minutes if no intervention were made. As a consequence of the direct coupling of model and regulator, the regulator changes the vapor feed before the concentration perturbation reaches the liquid phase. The back-coupling of the change in the amount of vapor via the model to the regulator changes the amount of vapor only to the extent that it compensates for the concentration change in the product stream between the column sections with a changed separating performance of the second column section. The concept thus simultaneously facilitates an inherent restriction of the control parameter. The early recognition of the perturbation and also the timely and precise control intervention makes the procedure of process control precise and robust. It can be recognized from FIGS. 1a and 1b that the measurements of feed amount and feed temperature, and also the reflux amount, the reflux and the top temperature, contribute to the process model and thus facilitate a feed forward strategy.

To calculate the liquid phase concentration, the process model uses the liquid/vapor ratio and also the number of theoretical plates of the second column section which depends on the column internals, for example trays or structured packing. Since the number of theoretical plates can be changed, for example, by fouling, the starting signal of the process model has to be checked with the aid of analytical data at certain time intervals of, for example, every 24 hours. In the event of deviations between the model and the analytical value, the model parameters are changed automatically. In the present case, the model parameter to be adapted is the number of theoretical plates. This is a physically interpretable parameter. The value of and change in this parameter indicates the condition of the column internals and can be used, for example, as information for determining maintenance intervals.

The numerical analysis of the process model allows its incorporation into closed-loop control circuits. Within the interval times of up to 0.5 s required for control purposes, the model calculates the new concentration values. The advantage of the process model is that its algorithm is robust and contains no iterative method, as is the case, for example, in U.S. Pat. No. 5,260,865. In contrast to the method described in this publication which is based on the concentration measured in the feed, the present process model starts from concentration measurements at the points in the column where the sensitivity is at its highest.

Compared to other process control concepts in which the target values of auxiliary control parameters, for example temperatures, are adjusted, the present process control also has the advantage that the controller explicitly specifies the desired concentration in the end product as the target value of the control parameter.

The invention is illustrated in detail below with the aid of FIGS. 1a and 1b by the examples which, however, do not constitute any restriction of the invention.

EXAMPLE

Figure 1A:
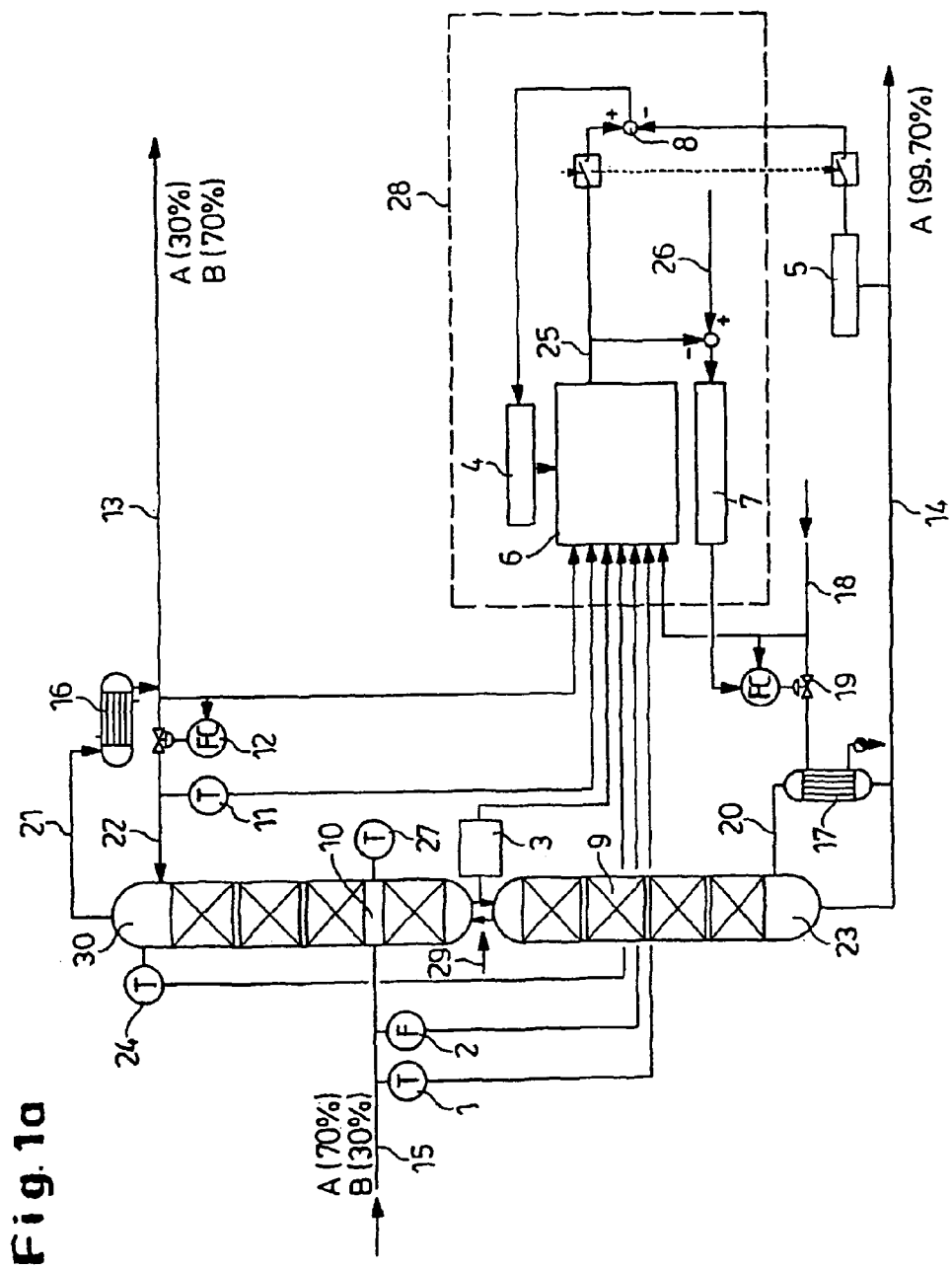
FIG. 1a shows a process schematic of a distillation plant having two subcolumns
Figure 1B:
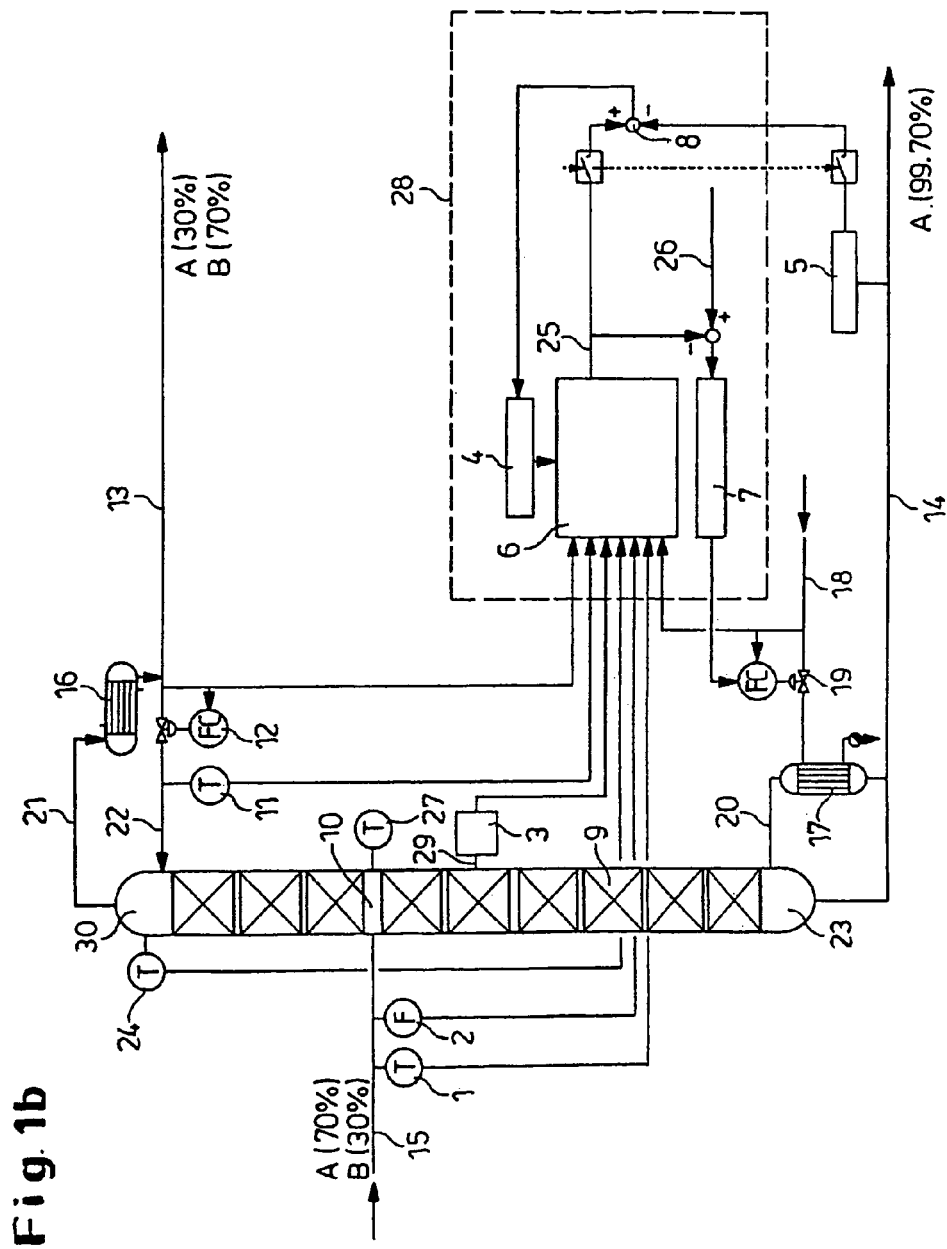
FIG. 1b shows a process schematic of a distillation plant having one column

FIG. 1a depicts a process schematic for an isomer separation. A mixture having a 70% fraction of the isomer A (p-nitrotoluene) is separated into a top product having a 30% isomer A fraction and a liquid phase product having a 99.70% isomer A fraction.

The mixture (p-nitrotoluene A, m-nitrotoluene B) is fed via a feed line 15 to the upper column section 10 of a two-part distillation column 9, 10, and the inlet is disposed in the lower third of column section 10. The sensor 1 registers the temperature and sensor 2 the feed amount of the A, B mixture.

At the top 30 of the column 10 having the temperature sensor 24, the A, B low boiler fraction is condensed via line 21 at a condenser 16 and partly withdrawn via line 13. The other portion is recycled as reflux 22 to the top section 30 via a valve having a quantity controller 12 and temperature measuring instrument 11.

Between the upper column section 10 and lower column section 9 is disposed a measuring point 29 with a near infrared spectrometer 3 in the region of the connecting lines.

At the bottom 23 of the lower column section 9 is mounted a bottom withdrawal line 14 from which a portion of the liquid phase product is recycled via the evaporator 17 and line 20 to the column section 9. The evaporator 17 is charged with vapor from the vapor line 18 via the control valve 19.

The measurements of the sensors 1, 2, 24, 11, 12, 18 and the analytical instrument 3 are passed to the computer 6.

At the withdrawal point 5, the sample of the liquid phase product is analyzed at certain time intervals (for example once a day) for its composition and compared to the calculated value of the liquid phase concentration (comparator 8 of the process control system 28 which includes the computer 6).

The online process model 6 used here for the binary A, B system has been derived from the steady state laws of thermodynamics and hydrodynamics, and simplified in such a way that, on the one hand, it reproduces the process behavior with the necessary precision for process control in the envisaged working range and, on the other hand, proceeds by simplified numerical analysis in the process control system 28 and can deliver the results required for control within the predefined time interval.

The result of the online process model is of predictive character. For instance, in the event of a perturbation, for example a rise in the low boiler concentration in the feed, the model reproduces its expected rise in the liquid phase product with a delay time of approx. 20 minutes in the stripping section 9. The model calculates the liquid phase concentration of component A from the concentration of A measured by the analytical instrument 3 at the measuring point 29 according to Equation 1:

$$X_{A,LP} = 1 - (1 - X_{A,online\,analysis}) \cdot \frac{m}{1 - (1-m) \cdot \frac{\left(\frac{m}{a}\right)^{n+1} - 1}{\left(\frac{m}{a}\right) - 1}}$$

The concentration of component A in the product stream leaving the bottom corresponds to the liquid phase concentration $X_{A,LP}$. This is obtained from the concentration of component A measured with the online analytical instrument at measuring point 29 $X_{A,\,online\,analysis}$ and the separating performance between this measuring point and the column bottom 23. To calculate the separating performance, the model can use, inter alia, the liquid to vapor ratio $\alpha$ or else the number of theoretical plates between measuring point 29 and column bottom 23 $n$.

For this purpose, the following equations 2 to 6 are also used:

Equation 2:

$$a = \frac{F}{D}$$

$$F = R_{int} + m_{Feed,int} \quad \text{Equation 3}$$

Equation 4:

$$R_{int} = R\left[1 + \frac{c_{ko}}{r_{ko}} \cdot (\vartheta_H - \vartheta_R)\right]$$

Equation 5:

$$m_{Feed,int} = m_{Feed} \cdot \left[1 + \frac{c_{Feed}}{r_{Feed}} \cdot (\vartheta_{Kol,Fe} - \vartheta_{Feed})\right]$$

Equation 6:

$$D = \left(\frac{r_D}{r_{LP}}\right) \cdot m_D$$

The liquid to vapor ratio $\alpha$ can be calculated from the amount of feed 2 in combination with the temperature difference determined from the temperatures 1 and 27, the amount of feed 12 in combination with the temperature difference determined from the temperatures 11 and 24 and the amount of vapor 18.

The number of plates n is dependent on the hydrodynamics determining the mass transfer and also on the condition of the structured packing and the liquid distributor. The number of plates is adjusted by means of laboratory analyses using equation 7:

$$n = \frac{\ln\left[\left(1 - \frac{a}{m}\right) \cdot \frac{(1 - X_{A,laboratory\,analysis}) - m \cdot (1 - X_{A,online\,analysis})}{(1 - X_{A,laboratory\,analysis}) - m \cdot (1 - X_{A,laboratory\,analysis})} + \frac{a}{m}\right]}{\ln\left(\frac{m}{a}\right)}$$

Samples 5 are taken at relatively long time intervals in order to determine the concentration in the product stream 14 which corresponds to the liquid phase concentration. The concentration is compared in 8 with the calculated concentration 25 from the process model. In the event of deviations between the measured and calculated concentration, the number of plates of the process model is adapted (model adjustment 4).

Since the model relates the increased low boiler fraction (the low boiler here is component B) at the measuring point to the present separating performance which was sufficient to maintain the liquid phase concentration before the perturbation, a higher low boiler fraction is calculated in the liquid phase concentration that is not yet present and would only be attained in the equilibrium state, i.e. after approx. 20 minutes. The value 25 calculated by the model is fed to the controller as the actual value of the control parameter. The controller 7 immediately increases the amount of vapor 18 until the increased low boiler fraction at the measuring point 29 together with the reduced liquid to vapor ratio leads back to the target value 26 of the liquid phase concentration. Since the change in the amount of vapor 18 is relayed back to the controller 7 via the model without time delay, robust control is obtained. This is supported by the fact that the controller 7 intervenes before the perturbation has reached the bottom 23 and that, as a consequence of the early intervention, the control parameter can be changed 19 in a precise manner.

In the event of a reduction in the low boiler fraction at the measuring point 29, the amount of vapor is only reduced to the extent that the reduced low boiler fraction together with the increased liquid to vapor ratio leads to the target value of the liquid phase concentration. The direct recycling of the amount of vapor 18 via the model back to the controller 7 only reduces the amount of vapor 18 to such an extent as is compatible with the reduced low boiler fraction at the measuring point 29. This may be regarded as an inherent control parameter restriction. Experience has shown that the system behaves robustly even in the event of severe perturbations to give only slight deviations in the actual value from the target value in the transition phase.

A list of the symbols used in the equations is given hereinbelow:

| | |
|---|---|
| $\theta_H$ | Temperature at the top of the column |
| $\theta_R$ | Temperature of the reflux |
| $\theta_{Feed}$ | Temperature of the feed |
| $\theta_{Kol,Fe}$ | Temperature of the column at the feed point |
| $c_{Feed}$ | Specific heat of the system in the feed |
| $c_{Ko}$ | Specific heat of the system at the top of the column |
| $r_{Feed}$ | Heat of evaporation of the system in the feed |
| $r_{Ko}$ | Heat of evaporation of the system at the top of the column |
| $r_{Lp}$ | Heat of evaporation of the system in the liquid phase of the column |
| $r_D$ | Heat of evaporation of the heating vapor fed to the column |
| m | Increase in the tangent on the equilibrium curve of the McCabe-Thiele diagram governing the system and the pressure at the bottom left point (low boiler fraction = zero) |
| $\alpha$ | Liquid to vapor ratio in the column section between measuring point 29 and bottom 23 |
| F | Liquid stream in the column section between measuring point 29 and bottom 23 |
| D | Vapor stream in the column section between measuring point 29 and bottom 23 |
| R | Amount of reflux, (externally) measured at 11 |
| $R_{int}$ | Internal liquid stream in the uppermost column section. This is obtained from the measured amount of reflux and the condensed vapor fraction of the vapors rising in the column whose condensation energy is required to raise the reflux temperature to the column temperature. |
| $m_{Feed}$ | Amount of feed, (externally) measured at 2 |
| $m_{Feed,int}$ | Liquid stream which results from the amount of feed measured 2 and the condensed vapor fraction of the rising vapors whose condensation energy is required to raise the feed temperature to the column temperature at the feed point. |
| $m_D$ | Vapor stream 18 to the column |
| n | Number of theoretical plates between measuring point 29 and column bottom 23 |
| $X_{A,Lp}$ | Concentration of component A in product stream 14 in molar fractions calculated by the process model (corresponds to the concentration in the liquid phase) |
| $X_{A,\text{online analysis}}$ | Concentration of component A measured by the online analytical instrument at the measuring point 29 in molar fractions |
| $X_{A,\text{laboratory analysis}}$ | Concentration of component A in the product stream 14 measured by means of laboratory analysis in molar fractions |

We claim:

1. A method for process control of distillation columns having a lower column section (9) and an upper column section (10) with control of the liquid phase concentration to separate a plurality of components A, B wherein
   a) the concentration of at least one of the components A, B is measured online at a point (29) between the uppermost tenth and the lowermost tenth of the length of the overall column (9, 10), by an analytical instrument (3),
   b) the concentration measured in a) of at least one of the components A or B is taken and used by an online process model in a computer unit (6) of a process control system (28), and the process model, within a time interval determined by the process control system (28) in accordance with the control technique, calculates a liquid phase concentration $X_{ALP}$ using the concentration measured in a) and further parameters measured directly in the column (9, 10) selected from the group consisting of temperature, pressure and mass flows of feed (15), reflux (22), heating medium feed, and vapor feed (18); the temperature at the top of the column and the temperature at the feed location (27) of column (10),
   c) the liquid phase concentration $X_{ALP}$ calculated using the process model is used for control, by treating the liquid phase concentration $X_{ALP}$ calculated by the model for control purposes as the actual value of the liquid phase concentration control parameter,
   d) the number of theoretical plates of structured packings or random packings and/or the degree of tray efficacy, are adapted over predetermined time intervals, to the prevailing column conditions, including, but not limited to, the degree of fouling, on the basis of analyses of the end product and introduction of the analytical data into the process model.

2. The method of claim 1, wherein the column is divided into at least two subcolumns (9) and (10), and the concentration measured in step a) is measured between the subcolumns (9) and (10).

3. The method of claim 2, wherein said further parameters further include the mass flows between the two column sections (9, 10) and the temperatures of the mass flows between said column sections.

4. The method of claim 1, wherein said analytical instrument is an NIR spectrometer, UV-VIS spectrometer, liquid chromatograph or gas chromatograph.

5. The method of claim 1, wherein the A, B mixtures separated have boiling points which differ from each other by at most 20 K.

6. The method of claim 1, wherein a combination of online analysis and process model is used for control of the concentration of the top product.

7. The method of claim 5, wherein said temperature difference is at most 10 K.

\* \* \* \* \*